(12) United States Patent
Takamuku et al.

(10) Patent No.: US 11,121,778 B1
(45) Date of Patent: Sep. 14, 2021

(54) PHASE VARIATION COMPENSATION DEVICE, PHASE VARIATION COMPENSATION METHOD AND COMMUNICATION DEVICE

(71) Applicant: NTT Electronics Corporation, Yokohama (JP)

(72) Inventors: Tomohiro Takamuku, Kanagawa (JP); Mitsuteru Yoshida, Kanagawa (JP); Tsutomu Takeya, Kanagawa (JP); Katsuichi Oyama, Kanagawa (JP); Hiroyuki Nouchi, Kanagawa (JP); Atsushi Suenaga, Kanagawa (JP)

(73) Assignees: NTT ELECTRONICS CORPORATION, Yokohama (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/255,156

(22) PCT Filed: Jul. 22, 2019

(86) PCT No.: PCT/JP2019/028656
§ 371 (c)(1),
(2) Date: Dec. 22, 2020

(87) PCT Pub. No.: WO2020/022268
PCT Pub. Date: Jan. 30, 2020

(30) Foreign Application Priority Data

Jul. 24, 2018 (JP) .............................. JP2018-138486

(51) Int. Cl.
*H04B 10/06* (2006.01)
*H04B 10/61* (2013.01)
*H04L 25/03* (2006.01)

(52) U.S. Cl.
CPC ....... *H04B 10/6164* (2013.01); *H04B 10/612* (2013.01); *H04B 10/6163* (2013.01);
(Continued)

(58) Field of Classification Search
CPC ............ H04B 10/6164; H04B 10/6165; H04B 10/6163; H04B 10/612; H04B 10/616;
(Continued)

(56) References Cited

U.S. PATENT DOCUMENTS 9,325,424 B2 * 4/2016 Mizuguchi ......... H04B 10/6165
2014/0270810 A1 9/2014 Nakajima
(Continued)

FOREIGN PATENT DOCUMENTS

JP 2014-003507 A 1/2014
JP 2014-155194 A 8/2014
(Continued)

OTHER PUBLICATIONS

Notification of Transmittal of Translation of the International Preliminary Report on Patentability issued by the International Bureau of WIPO for corresponding International Patent Application No. PCT/JP2019/028656, dated Feb. 4, 2021.

*Primary Examiner* — Hanh Phan
(74) *Attorney, Agent, or Firm* — Myers Wolin, LLC

(57) ABSTRACT

A known pattern comparison type phase difference detection unit (12) detects a phase difference between a known pattern extracted from a received signal and a true value of the known pattern as a first phase difference. M indicates the number of modulation phases in a phase modulation method of the received signal. An M-th power type phase difference detection unit (13) removes a modulation component by raising the received signal to M-th power, and detects phase variation from a modulation phase point used for mapping on a transmission side, as a second phase difference. A phase
(Continued)

compensation unit (11) compensates phase variation of the received signal based on an addition result of the first phase difference and the second phase difference.

9 Claims, 9 Drawing Sheets

(52) U.S. Cl.
CPC ............. *H04L 25/03006* (2013.01); *H04L 2025/03522* (2013.01)

(58) Field of Classification Search
CPC ... H04B 10/2507; H04B 10/40; H04L 7/0075; H04L 7/0041
USPC ....... 398/202, 208, 209, 204, 205, 207, 158, 398/159, 135, 136, 137, 138, 139, 183, 398/188
See application file for complete search history.

(56) References Cited

U.S. PATENT DOCUMENTS

| | | | | |
|---|---|---|---|---|
| 2015/0098714 A1* | 4/2015 | Hatae | ................. | H04B 10/6164 398/208 |
| 2015/0372766 A1* | 12/2015 | Yoshida | ................. | H04B 10/61 398/193 |

FOREIGN PATENT DOCUMENTS

| | | | |
|---|---|---|---|
| JP | 2014-175991 A | 9/2014 | |
| JP | 2015-76727 A | 4/2015 | |

* cited by examiner

PHASE VARIATION COMPENSATION DEVICE, PHASE VARIATION COMPENSATION METHOD AND COMMUNICATION DEVICE

CROSS-REFERENCE TO RELATED APPLICATION

This application is a national stage application of International Application No. PCT/JP2019/028656, filed on Jul. 22, 2019 and designated the U.S., which claims priority to Japanese Patent Application No. 2018-138486, filed on Jul. 24, 2018. The contents of each are herein incorporated by reference.

FIELD

The present disclosure relates to a phase variation compensation device, a phase variation compensation method and a communication device compensating phase variation in data communication.

BACKGROUND

In coherent optical communication, a frequency offset (a frequency error), which is a frequency difference, occurs between a frequency of a received signal and a frequency of a local oscillator light source. Further, phase variation such as phase noise occurs in the received signal due to non-linear optical effects, vibration of optical fibers, a laser line width (phase fluctuation) or the like. To cope with this, a technique has been proposed in which, after removing phase change due to modulation by raising an input signal to the M-th power, a frequency error is detected and fed back to an input side to compensate a frequency offset (see, for example, Patent Literature 1). However, though the frequency offset can be compensated to some extent, a lot of phase noise remains. Further, in this technique, a phase slip occurs under a condition of a lot of noise or waveform distortion, and there is a possibility that a continuous error occurs. A phase slip compensation circuit to compensate the phase slip is proposed (see, for example, Patent Literature 2).

Further, a technique is proposed in which a received signal is tentatively judged based on a threshold set according to an amplitude, and a difference between an original phase and a phase of the received signal is compensated (see, for example, Patent Literature 3). However, accuracy of phase noise compensation is low only with the tentative judgment. Therefore, by feeding back a frequency error and a phase error obtained during calculation to reduce phase variation before the tentative judgment, the accuracy is increased. Further, a technique is proposed in which a known pattern inserted on a transmission side is extracted from a received signal, and a difference between an original phase and a phase of the received signal is detected to compensate phase noise (see, for example, Patent Literature 4). However, there is a problem that phase variation is not sufficiently removed and remains.

CITATION LIST

Patent Literature

[Patent Literature 1] JP 2015-76727 A
[Patent Literature 2] JP 2014-003507 A
[Patent Literature 3] JP 2014-175991 A
[Patent Literature 4] JP 2014-155194 A

SUMMARY

Technical Problem

As described above, in a conventional phase variation compensation device and a phase variation compensation method, there is a problem that, even if phase noise compensation is performed, a phase variation is not sufficiently removed and remains. Further, there is a problem that, if a phase slip compensation circuit is provided, the circuit is complicated.

The present disclosure has been made to solve the problems as described above, and an object is to obtain a phase variation compensation device, a phase variation compensation method and a communication device capable of compensating phase variation with high accuracy, while simplifying a circuit.

Solution to Problem

A phase variation compensation device according to the present disclosure includes: first phase difference detection circuitry configured to detect a phase difference between a known pattern extracted from a received signal and a true value of the known pattern as a first phase difference; second phase difference detection circuitry configured to remove a modulation component by raising the received signal to M-th power, and detect phase variation from a modulation phase point used for mapping on a transmission side, as a second phase difference, wherein M indicates the number of modulation phases in a phase modulation method of the received signal; and phase compensation circuitry configured to compensate phase variation of the received signal based on an addition result of the first phase difference and the second phase difference.

Advantageous Effects

According to the present disclosure, it is possible to compensate phase variation with high accuracy, while simplifying a circuit.

DESCRIPTION OF EMBODIMENTS

A phase variation compensation device, a phase variation compensation method and a communication device according to the embodiments of the present disclosure will be described with reference to the drawings. The same components will be denoted by the same symbols, and the repeated description thereof may be omitted.

First Embodiment

Figure 1:
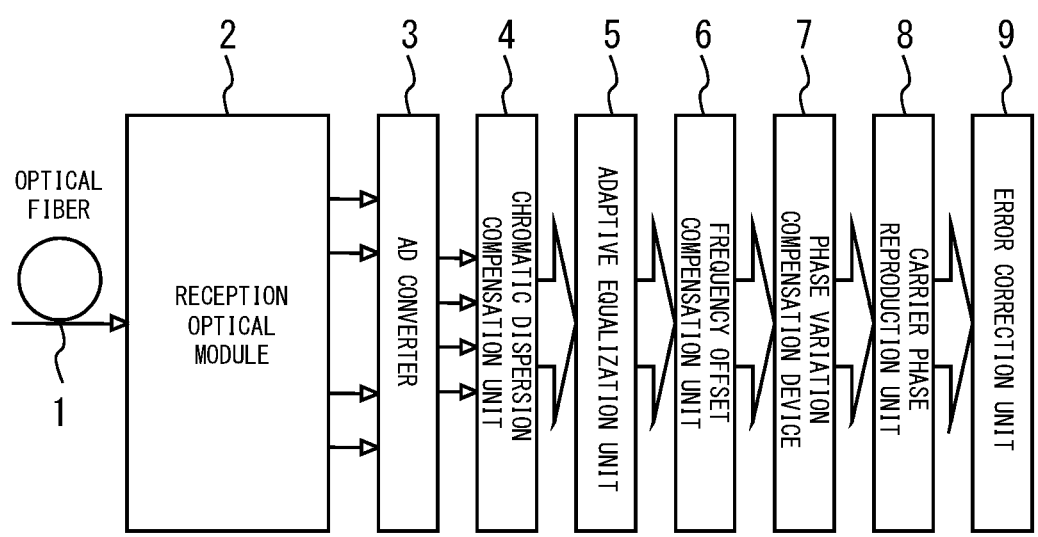
FIG. 1 is a diagram showing a receiver of a coherent optical communication device according to a first embodiment of the present disclosure.

FIG. 1 is a diagram showing a receiver of a coherent optical communication device according to a first embodiment of the present disclosure. The receiver converts an optical signal received from an optical fiber 1 to an electrical signal and performs digital processing.

In the receiver, the optical signal received from the optical fiber 1 is polarized and separated into a horizontally polarized signal and a vertically polarized signal by a reception optical module 2. Each of the two polarized and separated signals is separated into two orthogonal components and further converted to analog electrical signals. These analog electrical signals are converted to digital signals by an AD converter 3.

Components after a chromatic dispersion compensation unit 4 correspond to an optical transmission distortion compensation device that performs digital processing of orthogonal modulation signals outputted from the AD converter 3 as the digital signals to compensate distortion. Here, when the optical signal is propagated through the optical fiber 1, a signal waveform is distorted due to an effect of chromatic dispersion. The chromatic dispersion compensation unit 4 estimates the magnitude of the distortion from a received signal and performs compensation.

Further, in optical communication, when a horizontally polarized wave and a vertically polarized wave are combined and transmitted, and are separated at the time of being received, polarization variation occurs due to an effect of polarization mode dispersion, and a waveform is distorted. An adaptive equalization unit 5 performs an equalization process for compensating the distortion. Polarization separation is performed by an optical demodulator in the reception optical module 2 first, and polarization separation is performed more completely by the adaptive equalization unit 5. As a compensation process of the adaptive equalization unit 5, a method in which a long-cycle/known pattern signal or a short-cycle/known pattern signal is inserted on a transmission side to minimize an error from the signal received, and the like are proposed.

A frequency offset compensation unit 6 compensates a frequency error of a transmitted/received local signal (a carrier signal). A phase variation compensation device 7 compensates a residual frequency offset that has not been sufficiently compensated by the frequency offset compensation unit 6, and residual phase variation, phase noise or a phase slip that has not been sufficiently compensated by the adaptive equalization unit 5, using a known pattern signal or the like inserted on the transmission side.

A carrier phase reproduction unit 8 compensates phase variation that has not been sufficiently removed by the frequency offset compensation unit 6 and the phase variation compensation device 7. Specifically, the carrier phase reproduction unit 8 detects a shift Φ between a tentatively judged constellation (signal points) and a received constellation (signal points), and performs correction by performing phase rotation by Φ. The correction by the phase rotation can be performed by multiplying a signal in complex representation by exp (jΦ). However, when a residual frequency offset, residual phase variation and the like are almost compensated by the phase variation compensation device 7, the carrier phase reproduction unit 8 can be eliminated. After that, an error correction unit 9 performs an error correction process.

Figure 2:
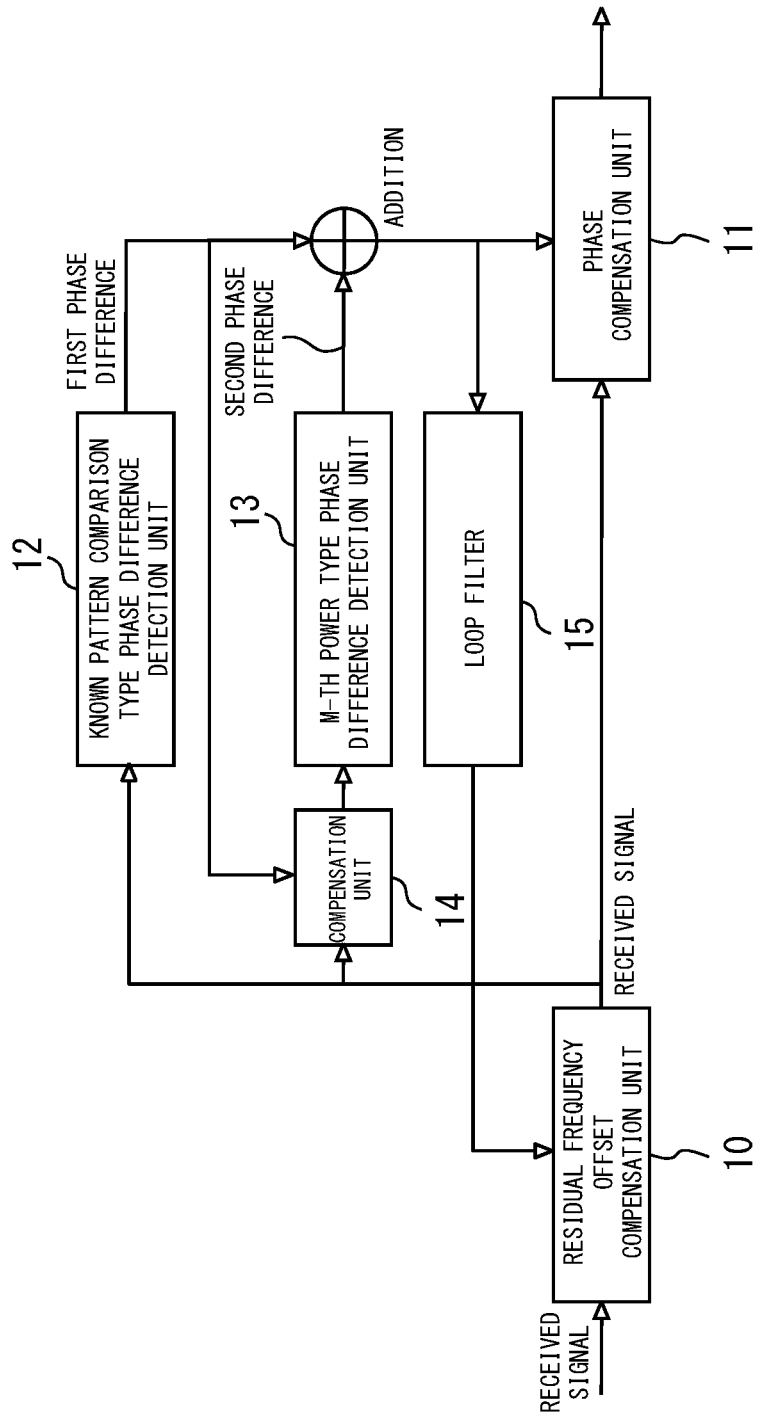
FIG. 2 is a configuration diagram of a phase variation compensation device according to the first embodiment of the present disclosure.

FIG. 2 is a configuration diagram of a phase variation compensation device according to the first embodiment of the present disclosure. For a received signal, frequency offset compensation has been performed before being inputted to the phase variation compensation device 7. Therefore, a received signal inputted to the phase variation compensation device 7 includes a residual frequency offset and phase noise that have not been sufficiently compensated by the frequency offset compensation. Note that it goes without saying that, furthermore, thermal noise is included. A residual frequency offset compensation unit 10 compensates the residual frequency offset. Further, a phase compensation unit 11 compensates phase variation such as the phase noise.

Though an input signal of the residual frequency offset compensation unit 10 is defined as a received signal here, other output signals are also referred to as received signals. Therefore, a received signal means not only an input signal of the phase variation compensation device 7 but also an output signal of the residual frequency offset compensation unit 10. The residual frequency offset compensation unit 10 is not essential. The present disclosure is also effective for a received signal, the residual frequency offset of which has been compensated in advance. Note that a received signal is identified as "an output signal of the residual frequency offset compensation unit 10" when necessary.

A known pattern comparison type phase difference detection unit 12 detects a phase difference between a known pattern extracted from a received signal and a true value of the known pattern as a first phase difference. Since this comparison is phase comparison on 2π, a phase variation of ±π can be detected. Note that the known pattern is inserted for every predetermined number of symbols. Therefore, by performing linear interpolation using the phase difference between the known pattern extracted from the received signal and the true value of the known pattern and a phase difference between the next known pattern and a true value, the known pattern comparison type phase difference detection unit 12 may calculate a phase difference for each symbol between both known patterns as a first phase difference. In the case of removing effects of noise, an amount of phase variation may be calculated by linear interpolation after extracting phases of adjacent successive known patterns and determining a moving average. In addition to the above-mentioned phase interpolation, it is also possible to perform interpolation processing with the electric field information as a signal from the relationship between the phase and the electric field described later. However, in this case, it is necessary to perform the interpolation processing by assuming that the amplitude is constant, for example, 1.

A received signal phase modulation method is modulation using a phase of 2πn/M. Here, M indicates the number of modulation phases (the number of PSK phases). Though n and M are natural numbers in principle, rational numbers are also possible. An M-th power type phase difference detection unit 13 removes a modulation component by raising a received signal to the M-th power, and detects phase variation from modulation phase points used for mapping on a transmission side, as a second phase difference (not an absolute amount but up to $2\pi/M$). The modulation phase points for mapping on the transmission side are, for example, two phase points of 0 degrees and 180 degrees in BPSK, and are, for example, four phase points of 45 degrees, 135 degrees, 225 degrees and 315 degrees in QPSK. The modulation component is removed by raising to the M-th power (in the present case, raising to the second power and the fourth power), a phase of each symbol is thus superimposed on an ideal phase that should originally be taken (one point, and zero during phase synchronization). Furthermore, effects of thermal noise can be reduced by averaging (for example, moving-averaging) values of a predetermined number of symbols. By this method, the second phase difference can be detected as a phase variation directly from an ideal phase.

A compensation unit 14 compensates phase variation of a received signal inputted to the M-th power type phase difference detection unit 13 with the first phase difference. By reducing the phase variation by the compensation unit 14 as far as possible, it is possible to increase accuracy of detecting a phase difference due to remaining phase variation in the M-th power type phase difference detection unit 13.

A result of addition of the first phase difference detected by the known pattern comparison type phase difference detection unit 12 and the second phase difference detected by the M-th power type phase difference detection unit 13 is supplied to the residual frequency offset compensation unit 10 and the phase compensation unit 11. Before supplying the received signal to the known pattern comparison type phase difference detection unit 12 and the M-th power type phase difference detection unit 13, the residual frequency offset compensation unit 10 compensates a residual frequency offset of the received signal based on the addition result supplied via a loop filter 15. The phase compensation unit 11 compensates phase variation of the received signal, such as phase noise, based on the addition result.

Figure 3:
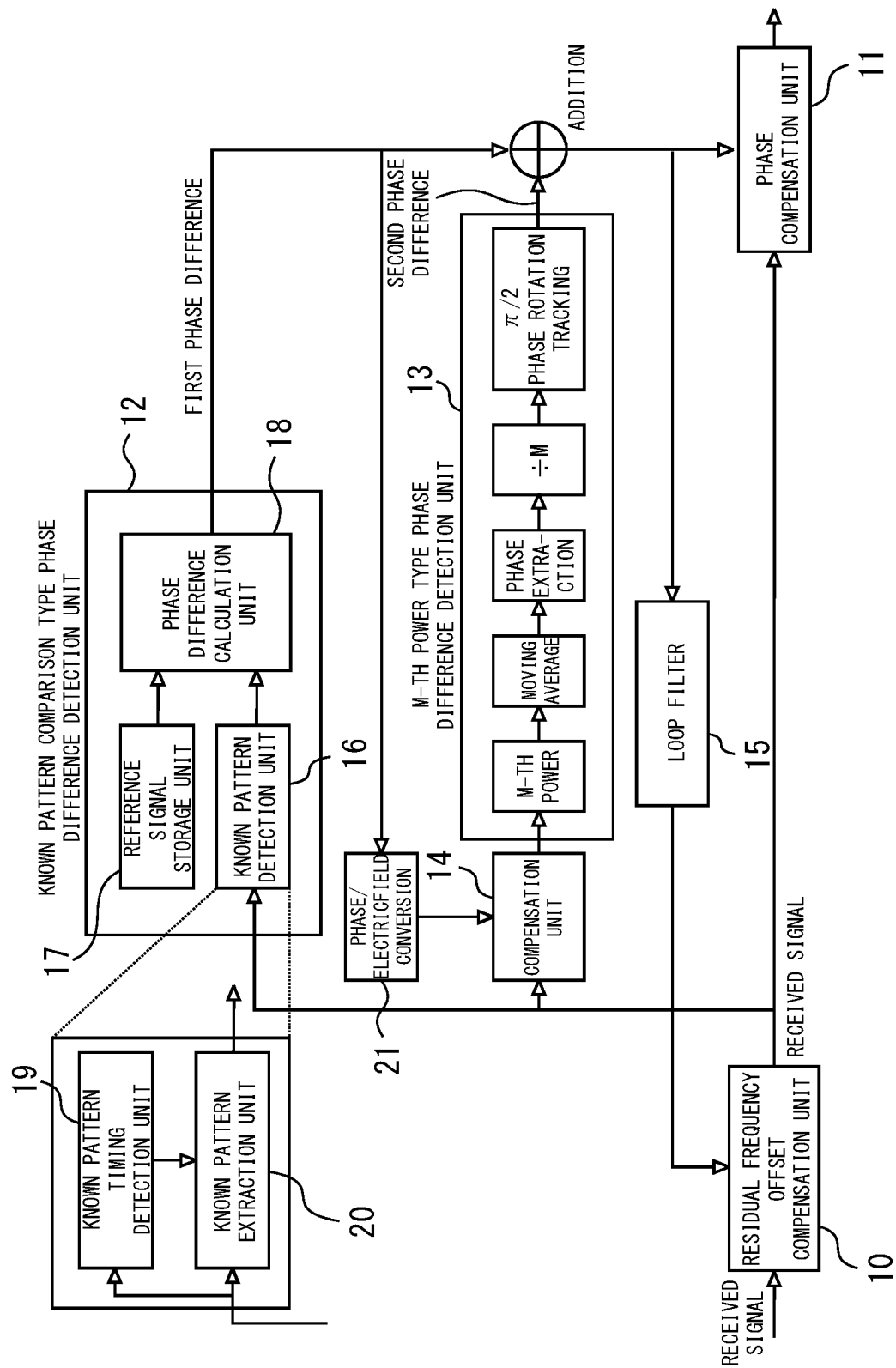
FIG. 3 is a more detailed configuration diagram of the phase variation compensation device according to the first embodiment of the present disclosure.

FIG. 3 is a more detailed configuration diagram of the phase variation compensation device according to the first embodiment of the present disclosure. The known pattern comparison type phase difference detection unit 12 has a known pattern detection unit 16 configured to detect a known pattern from a received signal, a reference signal memory 17 configured to store a true value of the known pattern, and a phase difference calculation unit 18 configured to calculate a phase difference between the known pattern extracted from the received signal and the true value as a first phase difference. The known pattern detection unit 16 has a known pattern timing detection unit 19 configured to detect a timing of a known pattern from a received signal and a known pattern extraction unit 20 configured to extract the known pattern from the received signal based on the detected timing.

By performing moving averaging of a predetermined number of symbols for a phase component from which a modulation component has been removed by raising a received signal to the M-th power, extracting only a phase error component and dividing the phase error component by M, the M-th power type phase difference detection unit 13 outputs a phase variation from an ideal phase (modulation phase points) as a second phase difference. Thereby, it is possible to extract a phase variation from which a modulation component has been removed. Note that a thermal noise component can be reduced by moving averaging. For example, in the case of QPSK, a modulation component becomes $2n\pi$ by a phase being multiplied by four at the time of M=4. By removing $2n\pi$, only a phase variation component can be extracted. By dividing the phase variation by four, an actual phase variation before the multiplication by four can be detected. Note that, when a phase variation is large, especially when an amount of phase variation between symbols exceeds $\pm 7\pi/4$, a $\pi/2$ phase rotation tracking circuit to cause $\pi/2$ rotations to be performed in a direction opposite to a variation direction is provided. This is a circuit for, when a phase variation larger than a predetermined value exists, following the phase variation.

For the M-th power type phase difference detection unit 13, a phase extraction position is not limited to a position between moving-averaging and a $\div M$ operation but may be any position after raising to the M-th power. The same goes for other embodiments described later. Further, since a circuit to convert electric field information in outputting a moving average to phase information at the time of performing phase extraction is normally designed, the circuit is not especially shown.

The first phase difference from the known pattern comparison type phase difference detection unit 12 is converted to an electric field by a phase/electric field conversion unit 21 and supplied to the compensation unit 14 of an input side of the M-th power type phase difference detection unit 13. Note that the term "electric field" used in the present specification means a complex signal or vector which is a modulation signal shown on polar coordinates. When a phase is indicated by $\varphi$, an electric field is indicated by $A\exp(j\varphi)=A(\cos \varphi+j \sin \varphi)$ (A indicates an amplitude).

A probability of an amount of phase variation of a signal inputted to the M-th power type phase difference detection unit 13 exceeding $\pm \pi/4$ is very low because an amount of phase variation detected by the known pattern comparison type phase difference detection unit 12 has been subtracted in advance. Therefore, in the case of this configuration, the $\pi/2$ phase rotation tracking of the M-th power type phase difference detection unit 13 can be omitted.

As described later, it is preferable to, when the known pattern comparison type phase difference detection unit 12 is not operating, or an input signal of the M-th power type phase difference detection unit 13 is not compensated beforehand due to stop of the compensation unit 14, provide the $\pi/2$ phase rotation tracking described above because a large phase variation remains. Note that an operation of the $\pi/2$ phase rotation tracking can be controlled by parameter setting or the like.

Figure 4:
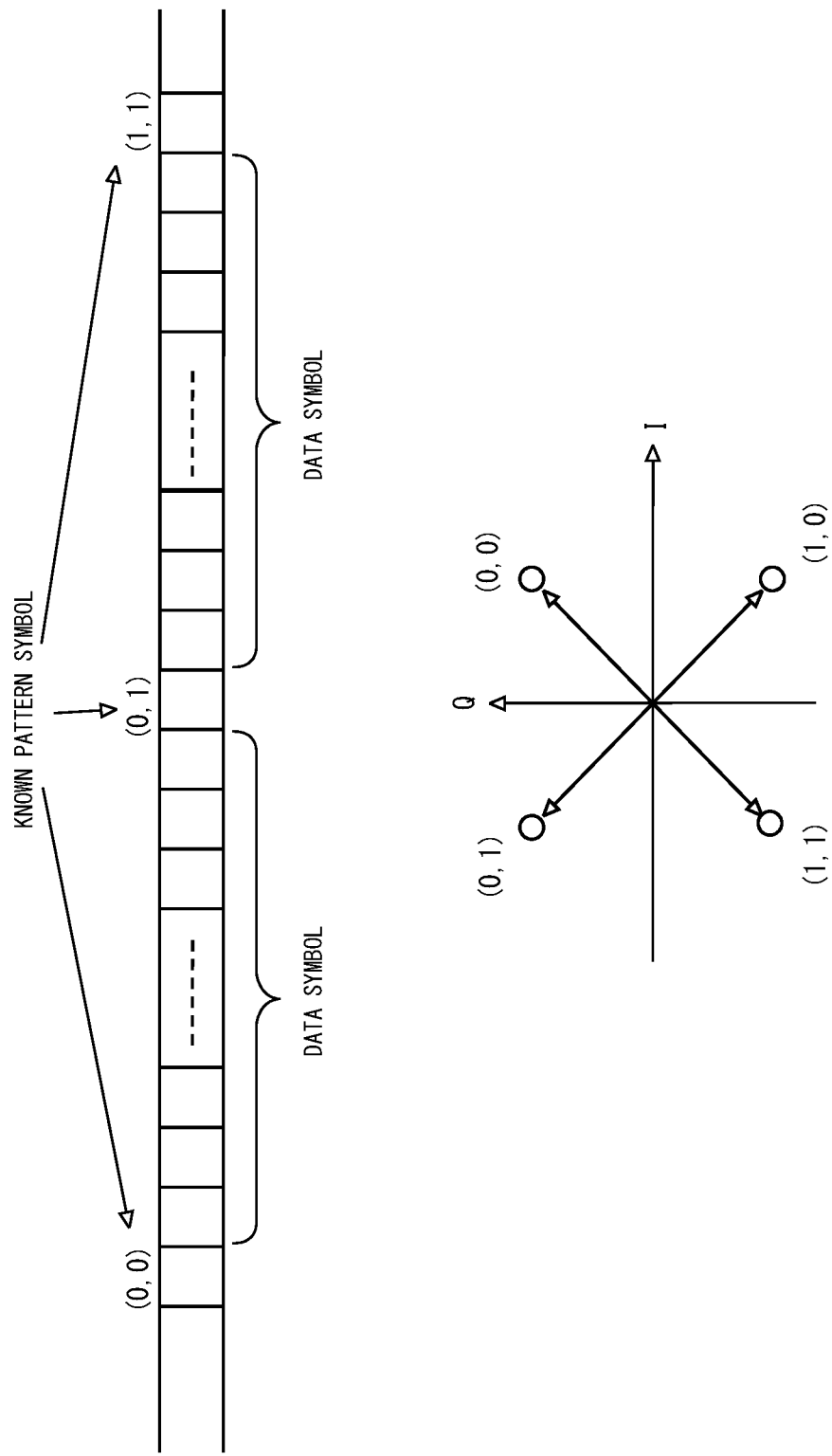
FIG. 4 is a diagram showing a known pattern of a transmitted signal.

FIG. 4 is a diagram showing a known pattern of a transmitted signal. As an example of phase mapping of data, a case where a known pattern is a QPSK pattern will be described. In this case, one symbol of a known pattern is inserted every predetermined number of data symbols (for example, every thirty-two symbols) in order of (0,0), (0,1), (1,1), (1,0), . . . on a transmission side. In other cases of multi-value modulations, a known pattern can be similarly configured.

Figure 5:
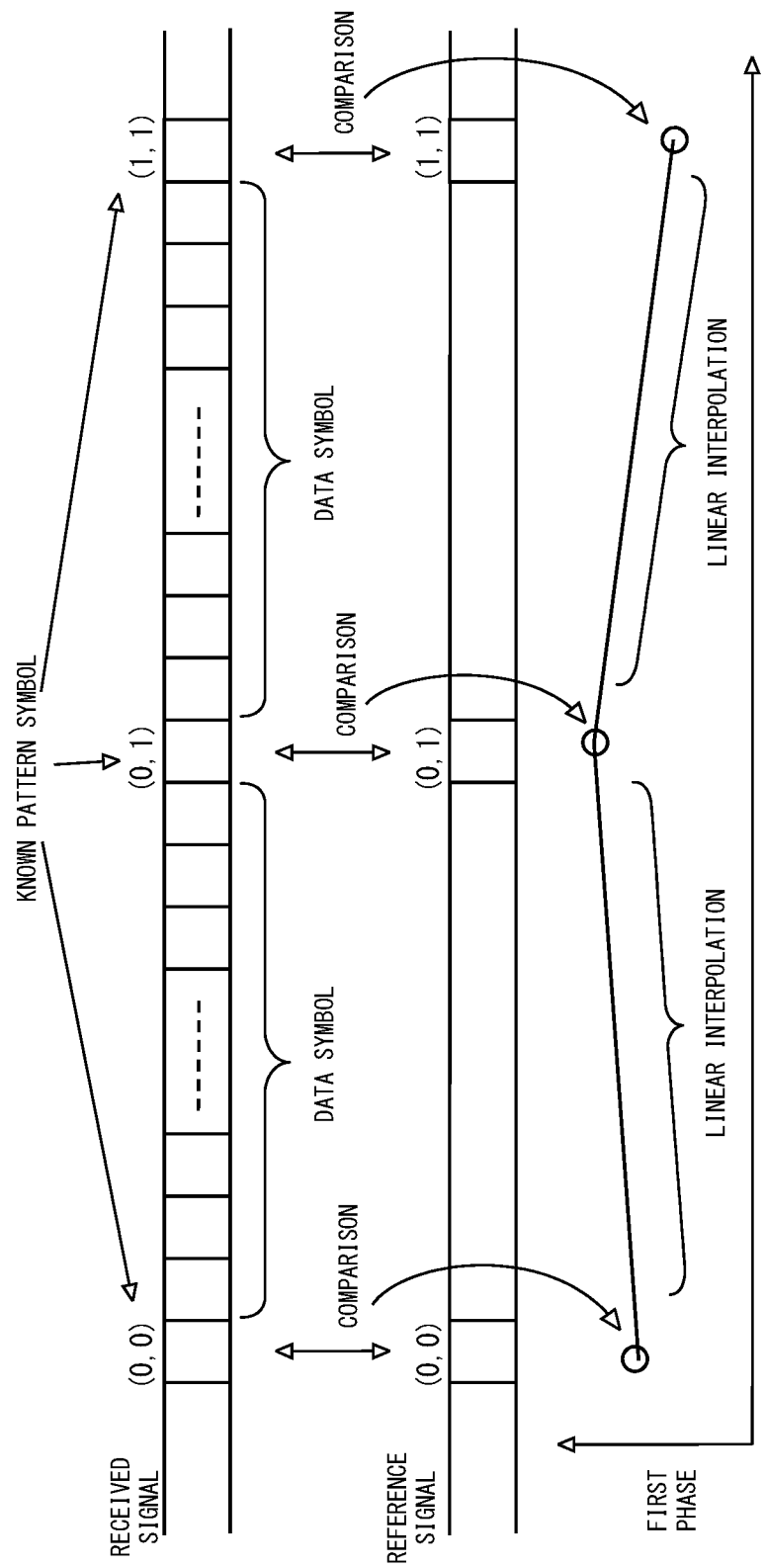
FIG. 5 is a diagram illustrating an operation of a phase difference calculation unit of a known pattern comparison type phase difference detection unit.

FIG. 5 is a diagram illustrating an operation of a phase difference calculation unit of a known pattern comparison type phase difference detection unit. On a reception side, the known pattern timing detection unit 19 detects a timing of a known pattern from a received signal. The known pattern extraction unit 20 extracts the known pattern. By comparing the extracted known pattern with a reference signal, the phase difference calculation unit 18 calculates, for each known pattern symbol, each phase difference of the known pattern symbol as a first phase difference. At this time, a phase difference for each data symbol, between the known pattern symbol and the next known pattern symbol is determined by linear interpolation, using a phase difference between the two adjacent known pattern symbols. At the time of calculating phases of the two adjacent known pattern symbols, a moving average of phases of successive known patterns may be determined. By this moving average, a phase detection error of the known patterns due to effects of thermal noise added to the received signal can be reduced.

Figure 6:
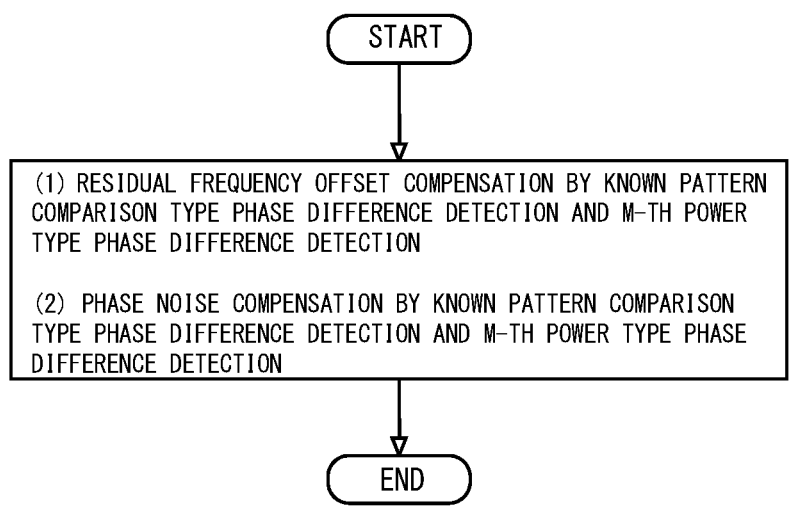
FIG. 6 is a diagram illustrating an operation of the phase variation compensation device according to the first embodiment of the present disclosure.

FIG. 6 is a diagram illustrating an operation of the phase variation compensation device according to the first embodiment of the present disclosure. In the phase variation compensation device according to the present embodiment, operations (1) and (2) below are performed in parallel.

(1) Residual Frequency Offset Compensation by Known Pattern Comparison Type Phase Difference Detection and M-Th Power Type Phase Difference Detection.

As shown in FIG. 5, the known pattern comparison type phase difference detection unit 12 compares a known pattern detected from a received signal with a reference signal and calculates a first phase difference for each symbol. This first phase difference is supplied to the residual frequency offset compensation unit 10 via the loop filter 15 and is also supplied to the phase compensation unit 11. Furthermore, this first phase difference is supplied to the compensation unit 14 on an input of the M-th power type phase difference detection unit 13 via the phase/electric field conversion unit 21. The compensation unit 14 compensates the input signal to the M-th power type phase difference detection unit 13 with the first phase difference from the known pattern comparison type phase difference detection unit 12 in advance. In other words, the M-th power type phase difference detection unit 13 performs processing in a state in which the first phase difference from the known pattern comparison type phase difference detection unit 12 has been removed from the input signal in advance. In this case, a phase variation of the input signal of the M-th power type phase difference detection unit 13 is at least equal to or smaller than $\pm\pi/4$, and it is possible to eliminate the $\pi/2$ phase rotation tracking for following a large phase variation. Actually, the $\pi/2$ phase rotation tracking is controlled not to operate, by parameter setting. Note that the compensation unit 14 can be configured by a method of performing complex multiplication of the received signal represented by an electric field vector by a first phase difference converted to an electric field vector. Thereby, an amount of phase variation determined by the known pattern comparison type phase difference detection unit 12 is removed from the received signal in advance. Phase/electric field conversion by the phase/electric field conversion unit 21 is not limited to an arithmetic operation but can also be performed with a memory table.

The M-th power type phase difference detection unit 13 performs raising to the M-th power, moving-averaging, phase extraction of a phase error component and a ÷M operation for the received signal compensated with the first phase difference, and outputs a second phase difference as a phase variation from a phase of an ideal signal from which a modulation component has been removed.

Next, the first phase difference from the known pattern comparison type phase difference detection unit 12 and the second phase difference from the M-th power type phase difference detection unit 13 are added up. A result of the addition is supplied to the residual frequency offset compensation unit 10 via the loop filter 15 and is also supplied to the phase compensation unit 11.

For the result of the addition of the first phase difference and the second phase difference, the loop filter 15 detects a phase variation between symbols (for example, phase difference of the n-th symbol–phase difference of the (n−1)th symbol) and performs moving averaging with a predetermined number of symbols. The residual frequency offset compensation unit 10 compensates the received signal using the value. A feedback loop of "received signal⇒detection of first and second phase differences⇒loop filter⇒residual frequency offset compensation⇒received signal" is configured. Specifically, the loop filter 15 detects rotation based on a phase difference for each symbol and corrects the received signal. The received signal is corrected until a phase rotation due to a residual frequency offset is not detected any more. After that, control is performed so that the residual frequency offset is removed by feedback. The loop filter 15 maintains an amount of correction. Thereby, the residual frequency offset that has not been sufficiently compensated by the frequency offset compensation unit 6 at a previous stage can be compensated.

The known pattern comparison type phase difference detection and the M-th power type phase difference detection are performed for the received signal compensated by the residual frequency offset compensation unit 10. In a converged state in which the residual frequency offset is almost compensated, a residual offset component is not detected by the known pattern comparison type phase difference detection unit 12 and the M-th power type phase difference detection unit 13 any more. The loop filter 15 continuously adjusts the amount of compensation to the residual frequency offset compensation unit 10 so that the residual frequency offset component is not detected any more.

Note that, though it has been stated that the loop filter 15 has functions of averaging and holding phase difference information, these functions are not limited to functions of the loop filter 15 but can be implemented in other circuits. Further, the loop filter 15 can be implemented with other functions such as a frequency filtering function. The convergence characteristics of the feedback loop can be changed by the configuration of the loop filter.

(2) Phase Noise Compensation by Known Pattern Comparison Type Phase Difference Detection and M-Th Power Type Phase Difference Detection.

Phase noise remains in a received signal, the residual frequency offset of which has been compensated. Therefore, at the time of convergence of residual frequency offset compensation, a result of addition of a first phase difference from the known pattern comparison type phase difference detection unit 12 and a second phase difference from the M-th power type phase difference detection unit 13 means phase noise. This result of addition is also supplied to the phase compensation unit 11, and phase noise existing in the received signal outputted from the residual frequency offset compensation unit 10 is compensated by the phase compensation unit 11. Specifically, the phase compensation unit 11 converts phase information, which is the result of addition, to an electric field vector and performs complex multiplication with an electric field vector which is an output signal of the residual frequency offset compensation unit 10. The output of the phase compensation unit 11 becomes a signal, the residual frequency offset and phase noise of which have been compensated.

As described above, in the present embodiment, a phase variation of a received signal is compensated, using a first phase difference from the known pattern comparison type phase difference detection unit 12 and a second phase difference from the M-th power type phase difference detection unit 13. Since a phase variation compensation range expands to $\pm\pi$ by using the first phase difference, it is possible to omit a phase slip compensation circuit required in the case of using only the second phase difference from the M-th power type phase difference detection unit 13. Therefore, it is possible to compensate phase variation with high accuracy, while simplifying a circuit. Further, by compensating an input of the M-th power type phase difference detection unit 13 with the first phase difference in advance, it is possible to improve accuracy of detection of the second phase difference by the M-th power type phase difference detection unit 13.

Note that it is not necessarily required to cause the known pattern comparison type phase difference detection unit 12 and the M-th power type phase difference detection unit 13 to operate together. If low power consumption is required, it is possible to cause only the known pattern comparison type phase difference detection unit 12 to operate. This can be easily realized by stopping all circuits of the M-th power type phase difference detection unit 13 and setting the second phase difference to zero. Therefore, in the case of use in a system where low power consumption is important in comparison with transmission performance, it is possible to respond only by changing settings.

Further, though description has been made on the case of QPSK modulation in the above example, the configuration of the present embodiment can be applied to the case of 16QAM. In the case of 16QAM, for four points that are the nearest to the origin and four points that are the farthest from the origin on a constellation, processing can be performed by setting M=4 similarly to the case of QPSK. As for eight points existing at intermediate positions among the points, processing is performed with M=4, and phase shift control is performed. The present embodiment can be similarly applied to other digital modulation methods.

Figure 7:
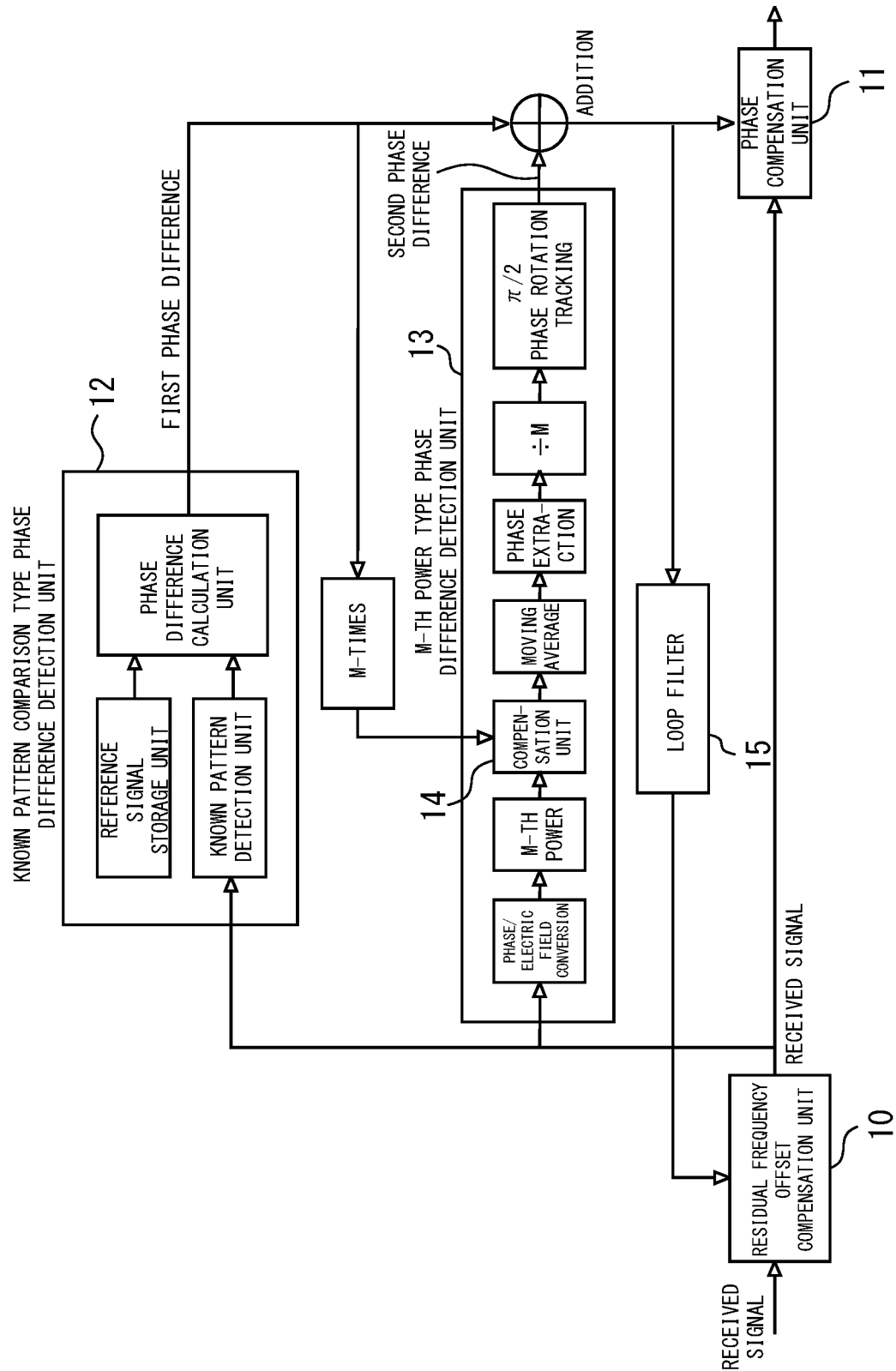
FIG. 7 is a configuration diagram showing a modification of the phase variation compensation device according to the first embodiment of the present disclosure.

FIG. 7 is a configuration diagram showing a modification of the phase variation compensation device according to the first embodiment of the present disclosure. In comparison with the device of FIG. 3, the modification is different in the configuration of the M-th power type phase difference detection unit 13 and the method of feedback from the known pattern comparison type phase difference detection unit 12 to the M-th power type phase difference detection unit 13, but is the same in the other components.

In the modification, the compensation unit 14 compensates phase variation of a received signal after being raised to the M-th power with a first phase difference. Further, according to multiplication of the phase of the input signal by M, the first phase difference inputted from the known pattern comparison type phase difference detection unit 12 to the compensation unit 14 is also multiplied by M. In this case, a compensation circuit of the compensation unit 14 can be configured with an adder. Effects of phase difference feedback from the known pattern comparison type phase difference detection unit 12 and effects of the M-th power type phase difference detection unit 13 are the same as the first embodiment.

However, in the case of supplying the first phase difference to the compensation unit 14, the phase/electric field conversion unit 21 and a complex multiplication circuit of the compensation unit 14 are required in the first embodiment. In comparison, in the modification, an electric field/phase conversion unit and two M-times multipliers (three-times adders in the case of M=4) and an adder of the compensation unit 14 are required. An adder can significantly reduce a circuit scale and power consumption in comparison with a complex multiplier. Therefore, the modification can reduce the circuit scale and power consumption in comparison with the first embodiment. The electric field/ phase conversion unit can be configured with an arithmetic operation etc. or a table similarly to the phase/electric field conversion unit 21.

Note that, though calculation processing about a phase is possible after the electric field/phase conversion unit in the modification, it is possible to, in the moving average processing, perform calculation more accurately by performing conversion to electric field information once and considering amplitude information. Note that it is within a normal designing range to perform conversion to phase information again before extracting a phase. Further, by using the same conversion table for a plurality of conversions between phase and electric field, the circuit scale can be reduced.

Second Embodiment

Figure 8:
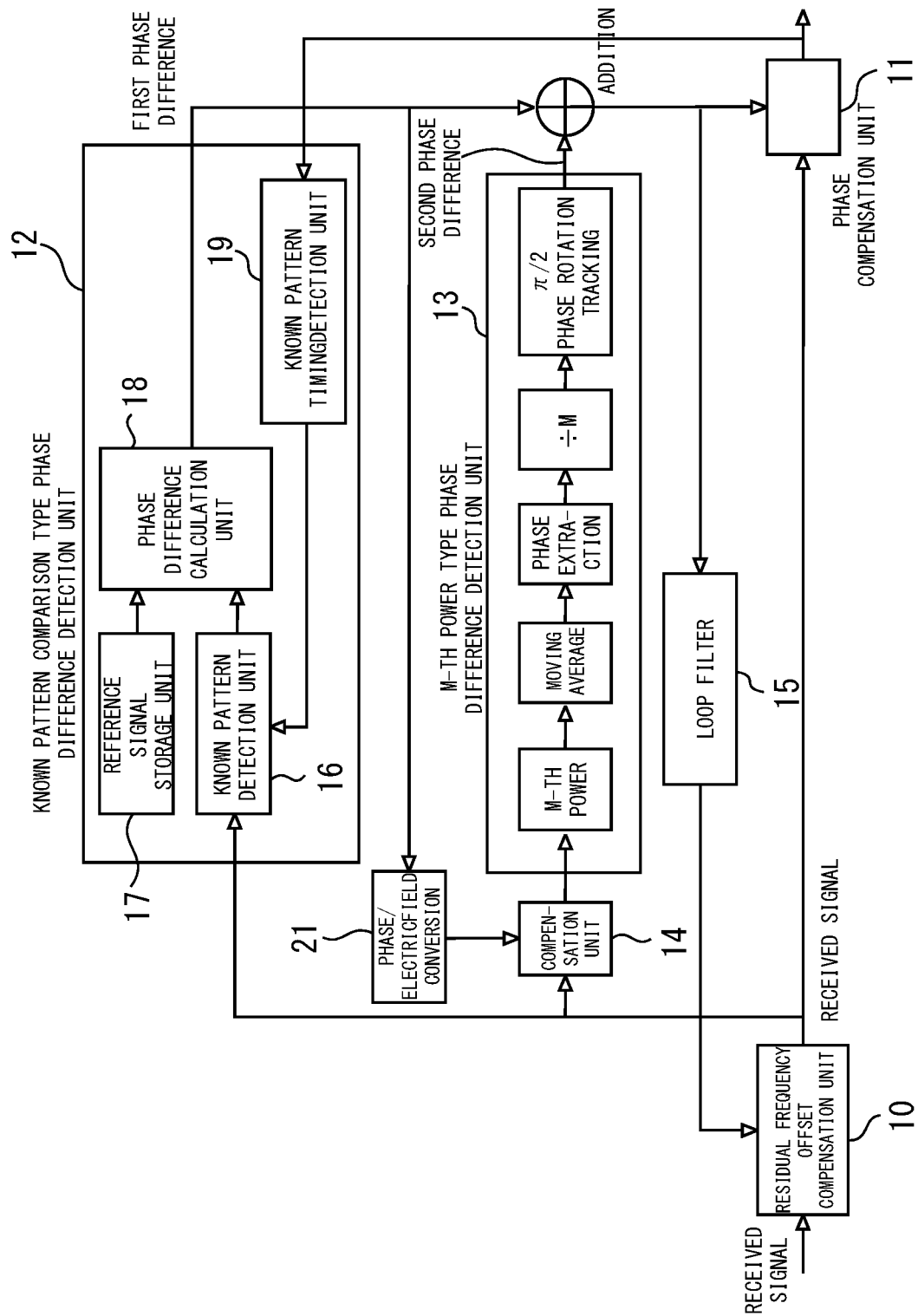
FIG. 8 is a configuration diagram showing a phase variation compensation device according to a second embodiment of the present disclosure.

FIG. 8 is a configuration diagram showing a phase variation compensation device according to a second embodiment of the present disclosure. In comparison with the first embodiment, the configuration of the known pattern comparison type phase difference detection unit 12 is different, but the other components are the same.

In the second embodiment, the known pattern timing detection unit 19 detects a timing of a known pattern from a received signal which has been phase-compensated by the phase compensation unit 11. The known pattern detection unit 16 detects the known pattern from the received signal before being phase-compensated by the phase compensation unit 11, based on this timing. Since a residual frequency offset and phase noise of the output signal of the phase compensation unit 11 have been compensated, the known pattern timing can be detected from the output signal more accurately. The known pattern extraction unit 20 can perform extraction of the known pattern accurately by using this timing. In this case, however, it is necessary to consider delay due to the processes of residual frequency offset compensation and phase noise compensation.

Figure 9:
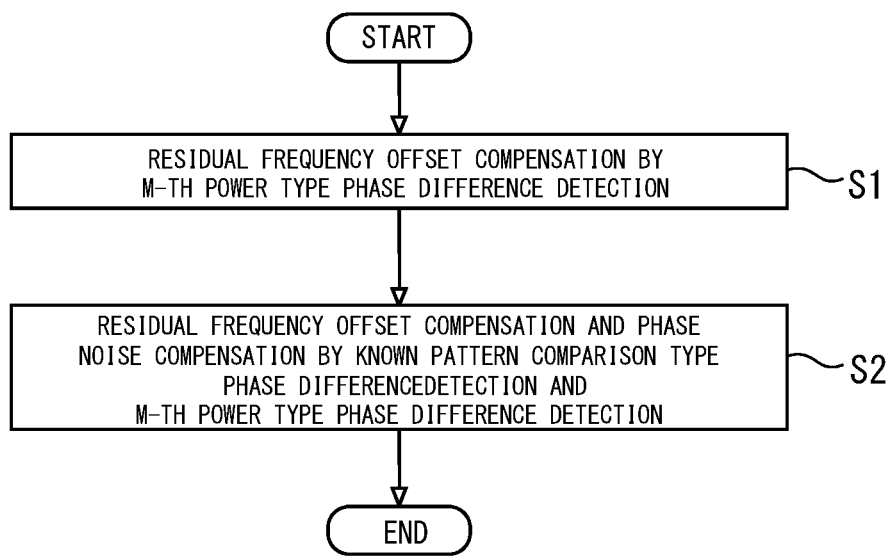
FIG. 9 is a diagram illustrating an operation of the phase variation compensation device according to the second embodiment of the present disclosure.

FIG. 9 is a diagram illustrating an operation of the phase variation compensation device according to the second embodiment of the present disclosure. The phase variation compensation device according to the present embodiment performs operations of steps S1 and S2 below in order.

Step S1: Residual Frequency Offset Compensation by M-Th Power Type Phase Difference Detection.

When the phase variation compensation device is started, compensation for an output signal of the phase compensation unit 11 is not completely performed. Therefore, an accurate known pattern timing is not obtained from the known pattern timing detection unit 19 to which the signal is inputted, and it is not possible to perform accurate calculation of a first phase difference. Therefore, only the M-th power type phase difference detection unit 13 operates and outputs a second phase difference. It is possible to, in order to prevent wrong compensation, perform control to stop the operation of the known pattern comparison type phase difference detection unit 12 during the period.

The M-th power type phase difference detection unit 13 performs raising to the M-th power, moving averaging, phase extraction of a phase error component and a ÷M operation for the received signal, and outputs a phase variation from which a modulation component has been removed, as a second phase difference. Since the known pattern comparison type phase difference detection unit 12 does not operate, the compensation unit 14 cannot compensate a large phase variation in advance, and the large phase variation is also inputted together with the received signal. Therefore, a π/2 phase rotation tracking circuit to respond to the large phase variation is provided at a subsequent stage of the M-th power type phase difference detection unit 13. Actually, an operation of the π/2 phase rotation tracking circuit can be controlled by parameter setting.

The second phase difference from the M-th power type phase difference detection unit 13 is supplied to the residual frequency offset compensation unit 10 via the loop filter 15 and is also supplied to the phase compensation unit 11. These operations are similar to those of the first embodiment.

It is possible to almost compensate a residual frequency offset and phase noise only by the M-th power type phase difference detection unit 13. Thereby, it becomes possible for the known pattern timing detection unit 19 to obtain a known pattern timing. At that timing, the known pattern comparison type phase difference detection unit 12 is caused to operate.

Step S2: Residual Frequency Offset Compensation and Phase Noise Compensation by Known Pattern Comparison Type Phase Difference Detection and M-Th Power Type Phase Difference Detection.

An operation in the case of causing the known pattern comparison type phase difference detection unit 12 to operate is similar to that of the first embodiment. Note that, in this case, an output of the known pattern comparison type phase difference detection unit 12 is fed back to an input of the M-th power type phase difference detection unit 13, and an input signal is compensated with a first phase difference, and, therefore, the operation of the π/2 phase rotation tracking circuit at the subsequent stage of the M-th power type phase difference detection unit 13 is stopped.

In the present embodiment, detection of a known pattern timing is performed by a signal for which residual frequency offset compensation and phase noise compensation have been performed. Thereby, extraction of a known pattern timing and detection of a known pattern can be accurately performed, and, therefore, it is possible to increase accuracy of the first phase difference. Since an input signal of the M-th power type phase difference detection unit 13 can be compensated with this first phase difference in advance, accuracy of the second phase difference can also be improved. Accuracy of the residual frequency offset compensation and the phase noise compensation based on these can also be improved. Other components and effects are similar to those of the first embodiment.

Note that the configuration of the modification of the first embodiment shown in FIG. 7 can be combined with the phase variation compensation device of the second embodiment shown in FIG. 8. Thereby, effects similar to those of the modification shown before can be obtained.

Note that the chromatic dispersion compensation may be performed by recording a program for realizing the phase variation compensation method according to the first or second embodiment in a computer-readable recording medium, making a computer system or a programmable logic device read the program recorded in the recording medium, and executing it. Note that the "computer system" here includes an OS and hardware such as a peripheral device or the like. In addition, the "computer system" also includes a WWW system including a homepage providing environment (or display environment). Furthermore, the "computer-readable recording medium" is a portable medium such as a flexible disk, a magneto-optical disk, a ROM or a CD-ROM, or a storage device such as a hard disk built in the computer system. Further, the "computer-readable recording medium" also includes the one holding the program for a fixed period of time, such as a volatile memory (RAM) inside the computer system to be a server or a client in the case that the program is transmitted through a network such as the Internet or a communication channel such as a telephone line. In addition, the program may be transmitted from the computer system storing the program in the storage device or the like to another computer system through a transmission medium or a transmission wave in the transmission medium. Here, the "transmission medium" that transmits the program is a medium having a function of transmitting information like the network (communication network) such as the Internet or the communication channel (communication line) such as the telephone line. Furthermore, the program may be the one for realizing a part of the above-described function. Further, it may be the one capable of realizing the above-described function by a combination with the program already recorded in the computer system, that is, a so-called difference file (difference program).

REFERENCE SIGNS LIST

7 phase variation compensation device; 10 residual frequency offset compensation unit (frequency offset compensation circuitry); 11 phase compensation unit; 12 known pattern comparison type phase difference detection unit (first phase difference detection circuitry); 13 M-th power type phase difference detection unit (second phase difference detection circuitry); 14 compensation unit; 17 reference signal memory; 18 phase difference calculation unit; 19 known pattern timing detection unit; 20 known pattern extraction unit

The invention claimed is:

1. A phase variation compensation device comprising:
   first phase difference detection circuitry configured to detect a phase difference between a known pattern extracted from a received signal and a true value of the known pattern as a first phase difference;
   second phase difference detection circuitry configured to remove a modulation component by raising the received signal to M-th power, and detect phase variation from a modulation phase point used for mapping on a transmission side, as a second phase difference, wherein M indicates the number of modulation phases in a phase modulation method of the received signal; and
   phase compensation circuitry configured to compensate phase variation of the received signal based on an addition result of the first phase difference and the second phase difference.

2. The phase variation compensation device according to claim 1, further comprising compensation circuitry configured to compensate phase variation of the received signal inputted to the second phase difference detection circuitry or the received signal raised to the M-th power, with a first phase difference.

3. The phase variation compensation device according to claim 1, further comprising frequency offset compensation circuitry configured to compensate a frequency offset of the received signal based on the addition result before supplying the received signal to the first phase difference detection circuitry and the second phase difference detection circuitry.

4. The phase variation compensation device according to claim 1, wherein the first phase difference detection circuitry includes:
   known pattern timing detection circuitry configured to detect a timing of the known pattern from the received signal;

known pattern extraction circuitry configured to extract the known pattern from the received signal based on the timing;

a reference signal memory configured to store the true value; and phase difference calculation circuitry configured to calculate a phase difference between the known pattern extracted from the received signal and the true value as the first phase difference.

5. The phase variation compensation device according to claim 4, wherein the known pattern timing detection circuitry detects a timing of the known pattern from the received signal phase-compensated by the phase compensation circuitry, and the known pattern extraction circuitry detects the known pattern from the received signal before being phase-compensated by the phase compensation circuitry, based on the timing.

6. The phase variation compensation device according to claim 1, wherein by performing linear interpolation using the phase difference between the known pattern extracted from the received signal and the true value and a phase difference between a next known pattern and a true value of the next known pattern, the first phase difference detection circuitry calculates a phase difference for each symbol between the known pattern and the next known pattern as the first phase difference.

7. A communication device comprising a phase variation compensation device comprising:

first phase difference detection circuitry configured to detect a phase difference between a known pattern extracted from a received signal and a true value of the known pattern as a first phase difference;

second phase difference detection circuitry configured to remove a modulation component by raising the received signal to the M-th power, and detect phase variation from a modulation phase point used for mapping on a transmission side, as a second phase difference, wherein M indicates the number of modulation phases in a phase modulation method of the received signal; and phase compensation circuitry configured to compensate phase variation of the received signal based on an addition result of the first phase difference and the second phase difference.

8. A phase variation compensation method performed by a phase variation compensation device comprising:

detecting a phase difference between a known pattern extracted from a received signal and a true value of the known pattern as a first phase difference;

removing a modulation component by raising the received signal to M-th power, and detecting phase variation from a modulation phase point used for mapping on a transmission side, as a second phase difference, wherein M indicates the number of modulation phases in a phase modulation method of the received signal; and compensating phase variation of the received signal based on an addition result of the first phase difference and the second phase difference.

9. The phase variation compensation method according to claim 8, wherein when the phase variation compensation device is started, a timing of the known pattern is detected from the received signal whose phase variation is compensated based on only the second phase difference, and the known pattern is extracted from the received signal before being phase-compensated, based on the timing, and after the first phase difference is detected from the known pattern extracted at startup of the phase variation compensation device, a timing of the known pattern is detected from the received signal whose phase variation is compensated based on the addition result of the first phase difference and the second phase difference, and the known pattern is extracted from the received signal before being phase-compensated, based on the timing.

* * * * *